US008055504B2

(12) United States Patent
Cross et al.

(10) Patent No.: US 8,055,504 B2
(45) Date of Patent: *Nov. 8, 2011

(54) SYNCHRONIZING VISUAL AND SPEECH EVENTS IN A MULTIMODAL APPLICATION

(75) Inventors: Charles W. Cross, Wellington, FL (US); Michael C. Hollinger, Memphis, TN (US); Igor R. Jablokov, Charlotte, NC (US); David B. Lewis, Ann Arbor, MI (US); Hilary A. Pike, Austin, TX (US); Daniel M. Smith, Raleigh, NC (US); David W. Wintermute, Boynton Beach, FL (US); Michael A. Zaitzeff, Carson City, NV (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/061,750

(22) Filed: Apr. 3, 2008

(65) Prior Publication Data

US 2008/0177530 A1  Jul. 24, 2008

Related U.S. Application Data

(63) Continuation of application No. 11/154,898, filed on Jun. 16, 2005.

(51) Int. Cl.
*G10L 11/00* (2006.01)

(52) U.S. Cl. ............ 704/270; 704/9; 704/246; 704/247; 704/251; 704/252

(58) Field of Classification Search .............. 704/9, 246, 704/251
See application file for complete search history.

(56) References Cited

U.S. PATENT DOCUMENTS

| 5,577,165 | A | * | 11/1996 | Takebayashi et al. ........ 704/275 |
| 5,584,052 | A | | 12/1996 | Galau et al. |
| 5,969,717 | A | | 10/1999 | Ikemoto |
| 6,243,375 | B1 | | 2/2001 | Speicher |
| 6,208,972 | B1 | | 3/2001 | Grant et al. |
| 6,275,806 | B1 | | 8/2001 | Pertrushin |

(Continued)

FOREIGN PATENT DOCUMENTS

CN       1385783       12/2002

(Continued)

OTHER PUBLICATIONS

U.S. Appl. No. 10/924,520, filed Aug. 24, 2004, Charles W. Cross.

(Continued)

*Primary Examiner* — Leonard Saint Cyr
(74) *Attorney, Agent, or Firm* — Wolf, Greenfield & Sacks, P.C.

(57) ABSTRACT

Exemplary methods, systems, and products are disclosed for synchronizing visual and speech events in a multimodal application, including receiving from a user speech; determining a semantic interpretation of the speech; calling a global application update handler; identifying, by the global application update handler, an additional processing function in dependence upon the semantic interpretation; and executing the additional function. Typical embodiments may include updating a visual element after executing the additional function. Typical embodiments may include updating a voice form after executing the additional function. Typical embodiments also may include updating a state table after updating the voice form. Typical embodiments also may include restarting the voice form after executing the additional function.

17 Claims, 4 Drawing Sheets

U.S. PATENT DOCUMENTS

| | | | |
|---|---|---|---|
| 6,301,560 | B1 | 10/2001 | Masters |
| 6,513,011 | B1 | 1/2003 | Uwakubo |
| 6,606,599 | B2 | 8/2003 | Grant et al. |
| 6,856,960 | B1 | 2/2005 | Dragosh et al. |
| 6,920,425 | B1 | 7/2005 | Will et al. |
| 6,999,930 | B1 | 2/2006 | Roberts et al. |
| 7,035,805 | B1 | 4/2006 | Miller |
| 7,171,243 | B2 | 1/2007 | Watanabe et al. |
| 7,188,067 | B2 | 3/2007 | Grant et al. |
| 7,330,890 | B1 | 2/2008 | Partovi et al. |
| 7,376,586 | B1 | 5/2008 | Partovi et al. |
| 7,487,085 | B2 | 2/2009 | Ativanichayaphong et al. |
| 7,509,569 | B2 | 3/2009 | Barrus et al. |
| 2002/0065944 | A1 | 5/2002 | Hickey et al. |
| 2002/0092019 | A1 | 7/2002 | Marcus |
| 2002/0099553 | A1 | 7/2002 | Brittan et al. |
| 2002/0120554 | A1 | 8/2002 | Vega |
| 2002/0147593 | A1 | 10/2002 | Lewis et al. |
| 2002/0184610 | A1 | 12/2002 | Chong et al. |
| 2003/0039341 | A1 | 2/2003 | Burg et al. |
| 2003/0046316 | A1 | 3/2003 | Gergic et al. |
| 2003/0046346 | A1* | 3/2003 | Mumick et al. ............... 709/205 |
| 2003/0101451 | A1 | 5/2003 | Bentolila et al. |
| 2003/0125945 | A1 | 7/2003 | Doyle |
| 2003/0179865 | A1 | 9/2003 | Stillman et al. |
| 2003/0182622 | A1* | 9/2003 | Sibal et al. ................... 715/511 |
| 2003/0195739 | A1 | 10/2003 | Washio |
| 2003/0217161 | A1 | 11/2003 | Balasuriya |
| 2003/0229900 | A1 | 12/2003 | Reisman |
| 2003/0235282 | A1 | 12/2003 | Sichelman et al. |
| 2004/0019487 | A1 | 1/2004 | Kleindienst et al. |
| 2004/0025115 | A1 | 2/2004 | Seinel et al. |
| 2004/0031058 | A1 | 2/2004 | Reisman |
| 2004/0044516 | A1 | 3/2004 | Kennewick et al. |
| 2004/0049390 | A1 | 3/2004 | Brittan et al. |
| 2004/0059705 | A1 | 3/2004 | Wittke et al. |
| 2004/0083109 | A1 | 4/2004 | Halonen et al. |
| 2004/0120472 | A1 | 6/2004 | Popay et al. |
| 2004/0120476 | A1 | 6/2004 | Harrison et al. |
| 2004/0138890 | A1 | 7/2004 | Ferrans et al. |
| 2004/0153323 | A1 | 8/2004 | Charney et al. |
| 2004/0179038 | A1 | 9/2004 | Blattner et al. |
| 2004/0216036 | A1 | 10/2004 | Chu et al. |
| 2004/0236574 | A1 | 11/2004 | Ativanichayaphong et al. |
| 2004/0260562 | A1 | 12/2004 | Kijirai |
| 2005/0075884 | A1 | 4/2005 | Badt, Jr. |
| 2005/0091059 | A1 | 4/2005 | Lecoeuche |
| 2005/0131701 | A1 | 6/2005 | Cross |
| 2005/0138219 | A1 | 6/2005 | Boughannam |
| 2005/0138647 | A1 | 6/2005 | Boughannam |
| 2005/0154580 | A1 | 7/2005 | Horowitz et al. |
| 2005/0160461 | A1 | 7/2005 | Baumgartner et al. |
| 2005/0188412 | A1 | 8/2005 | Dacosta |
| 2005/0203729 | A1 | 9/2005 | Roth et al. |
| 2005/0203747 | A1 | 9/2005 | Lecoeuche |
| 2005/0261908 | A1 | 11/2005 | Cross |
| 2005/0273769 | A1 | 12/2005 | Eichenberger |
| 2005/0283367 | A1 | 12/2005 | Ativanichayaphong et al. |
| 2006/0047510 | A1 | 3/2006 | Ativanichayaphong et al. |
| 2006/0064302 | A1 | 3/2006 | Ativanichayaphong et al. |
| 2006/0069564 | A1 | 3/2006 | Allison et al. |
| 2006/0074680 | A1 | 4/2006 | Cross |
| 2006/0075120 | A1 | 4/2006 | Smit |
| 2006/0111906 | A1 | 5/2006 | Cross |
| 2006/0122836 | A1 | 6/2006 | Cross |
| 2006/0123358 | A1 | 6/2006 | Lee et al. |
| 2006/0136222 | A1 | 6/2006 | Cross |
| 2006/0146728 | A1* | 7/2006 | Engelsma et al. ............ 370/252 |
| 2006/0168095 | A1* | 7/2006 | Sharma et al. ................ 709/217 |
| 2006/0168595 | A1 | 7/2006 | McArdle |
| 2006/0184626 | A1 | 8/2006 | Agapi |
| 2006/0190264 | A1 | 8/2006 | Jaramillo |
| 2006/0218039 | A1 | 9/2006 | Johnson |
| 2006/0229880 | A1 | 10/2006 | White |
| 2006/0235694 | A1 | 10/2006 | Cross |
| 2006/0287845 | A1 | 12/2006 | Cross et al. |
| 2006/0287865 | A1 | 12/2006 | Cross et al. |
| 2006/0287866 | A1 | 12/2006 | Cross et al. |
| 2006/0288309 | A1 | 12/2006 | Cross et al. |
| 2006/0290709 | A1* | 12/2006 | Omi et al. ..................... 345/594 |
| 2007/0265851 | A1 | 11/2007 | Ben-David et al. |
| 2007/0274296 | A1 | 11/2007 | Cross et al. |
| 2007/0274297 | A1 | 11/2007 | Cross et al. |
| 2007/0288241 | A1 | 12/2007 | Cross et al. |
| 2007/0294084 | A1 | 12/2007 | Cross |
| 2008/0065386 | A1 | 3/2008 | Cross et al. |
| 2008/0065387 | A1 | 3/2008 | Cross et al. |
| 2008/0065388 | A1 | 3/2008 | Cross et al. |
| 2008/0065389 | A1 | 3/2008 | Cross et al. |
| 2008/0065390 | A1 | 3/2008 | Ativanichayaphong et al. |
| 2008/0086564 | A1 | 4/2008 | Putman et al. |
| 2008/0140410 | A1 | 6/2008 | Ativanichayaphong et al. |
| 2008/0162136 | A1 | 7/2008 | Agapi et al. |
| 2008/0177530 | A1 | 7/2008 | Cross et al. |
| 2008/0195393 | A1 | 8/2008 | Cross et al. |
| 2008/0208584 | A1 | 8/2008 | Ativanichayaphong et al. |
| 2008/0208585 | A1 | 8/2008 | Ativanichayaphong et al. |
| 2008/0208586 | A1 | 8/2008 | Ativanichayaphong et al. |
| 2008/0208587 | A1 | 8/2008 | Ben-David et al. |
| 2008/0208588 | A1 | 8/2008 | Ativanichayaphong et al. |
| 2008/0208589 | A1 | 8/2008 | Cross et al. |
| 2008/0208590 | A1 | 8/2008 | Cross et al. |
| 2008/0208591 | A1 | 8/2008 | Ativanichayaphong et al. |
| 2008/0208592 | A1 | 8/2008 | Cross et al. |
| 2008/0208593 | A1 | 8/2008 | Ativanichayaphong et al. |
| 2008/0208594 | A1 | 8/2008 | Cross et al. |
| 2008/0228494 | A1 | 9/2008 | Cross et al. |
| 2008/0228495 | A1 | 9/2008 | Cross et al. |
| 2008/0235021 | A1 | 9/2008 | Cross et al. |
| 2008/0235022 | A1 | 9/2008 | Bergl et al. |
| 2008/0235027 | A1 | 9/2008 | Cross |
| 2008/0235029 | A1 | 9/2008 | Cross et al. |
| 2008/0249782 | A1 | 10/2008 | Ativanichayaphong et al. |
| 2008/0255850 | A1 | 10/2008 | Cross et al. |
| 2008/0255851 | A1 | 10/2008 | Ativanichayaphong et al. |

FOREIGN PATENT DOCUMENTS

| | | |
|---|---|---|
| CN | 1385783 A | 12/2002 |
| CN | 1564123 A | 1/2005 |
| EP | 0794670 A | 9/1997 |
| EP | 1450350 | 8/2004 |
| EP | 0507148.5 | 4/2005 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

U.S. Appl. No. 10/945,112, filed Sep. 20, 2004, Charles W. Cross.
U.S. Appl. No. 10/870,517, filed Jun. 17, 2004, Charles W. Cross.
U.S. Appl. No. 10/441,839, filed May 20, 2003, Soonthom Atlvanichayaphong.
U.S. Appl. No. 11/062,731, filed Feb. 22, 2005, David Jaramillo.
U.S. Appl. No. 11/007,830, filed Dec. 8, 2004, Charles W. Cross.
U.S. Appl. No. 10/945,119, filed Sep. 20, 2004, Charles W. Cross.
U.S. Appl. No. 11/022,464, filed Dec. 22, 2004, Charles W. Cross.
U.S. Appl. No. 10/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapl.
U.S. Appl. No. 11/093,545, filed Mar. 30, 2005, Marc White.
U.S. Appl. No. 11/105,865, filed Apr. 14, 2005, Charles W. Cross.
U.S. Appl. No. 10/849,642, filed May 19, 2004, Charles W. Cross.
U.S. Appl. No. 10/992,979, filed Nov. 19, 2004, Charles W. Cross.
U.S. Appl. No. 10/733,610, filed Dec. 11, 2003, Charles W. Cross.
Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. PCT/EP2008/051358.

PCT Search Report, Jun. 18, 2008; PCT Application No. PCT/EP2008/051363.

Didier Guillevic, et al.,Robust Semantic Confidence Scoring ICSLP 2002: $7^{th}$ International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.

* cited by examiner

SYNCHRONIZING VISUAL AND SPEECH EVENTS IN A MULTIMODAL APPLICATION

CROSS-REFERENCE TO RELATED APPLICATION

This application is a continuation application of and claims priority from U.S. patent application Ser. No. 11/154,898, filed on Jun. 16, 2005.

BACKGROUND OF THE INVENTION

1. Field of the Invention

The field of the invention is data processing, or, more specifically, methods, systems, and products for synchronizing visual and speech events in a multimodal application.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through other modes, such as multimodal access. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications often run on servers that serve up multimodal web pages for display on a multimodal browser. A 'multimodal browser,' as the term is used in this specification, generally means a web browser capable of receiving multimodal input and interacting with users with multimodal output. Multimodal browsers typically render web pages written in XHTML+Voice (X+V). X+V provides a markup language that enables users to interact with an multimodal application often running on a server through spoken dialog in addition to traditional means of input such as keyboard strokes and mouse pointer action. X+V adds spoken interaction to standard web content by integrating XHTML (eXtensible Hypertext Markup Language) and speech recognition vocabularies supported by Voice XML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

The top-level VocieXML element is <vxml>, which is a container for dialogs. There are two kinds of dialogs: forms and menus. Voice forms define an interaction that collects values for a set of form item variables. Each form item variable of a voice form may specify a grammar that defines the allowable inputs for that form item. If a form-level grammar is present, it can be used to fill several form items from one utterance. A menu presents the user with a choice of options and then transitions to another dialog based on that choice.

Forms are interpreted by a form interpretation algorithm (FIA). An FIA typically includes a main loop that repeatedly selects form items collects user input and identifies any actions to be taken in response to input items. Interpreting a voice form item typically includes selecting and playing one or more voice prompts, collecting user input, either a response that fills in one or more input items, or a throwing of some event (a help even, for example), and interpreting any actions that pertained to the newly filled in input items.

To synchronize the receipt of spoken information and visual elements, X+V provides a <sync> element. The <sync> element synchronizes data entered through various multimodal input. That is, the <sync> element synchronizes accepted speech commands received in the multimodal browser with visual elements displayed in the multimodal browser. <Sync> synchronizes the value property of an XHTML input control with a VoiceXML field in a one to one manner. <Sync> does not activate a voice handler and therefore does not allow for the identification and execution of further additional functions in response to a particular speech command. There is therefore an ongoing need for improvement in synchronizing visual and speech events in a multimodal application that allows for execution of multiple application functions in response to a speech command received in a voice form or voice menu.

SUMMARY OF THE INVENTION

More particularly, exemplary methods, systems, and products are disclosed for synchronizing visual and speech events in a multimodal application, including receiving from a user speech; determining a semantic interpretation of the speech; calling a global application update handler; identifying, by the global application update handler, an additional processing function in dependence upon the semantic interpretation; and executing the additional function. Typical embodiments may include updating a visual element after executing the additional function. Typical embodiments may include updating a voice form after executing the additional function. Typical embodiments also may include updating a state table after updating the voice form. Typical embodiments also may include restarting the voice form after executing the additional function.

In typical embodiments, calling a global application update handler also include exiting a voice form. Calling a global application update handler also includes exiting a voice menu.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for synchronizing visual and speech events in a multimodal application. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, transmission media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Synchronizing Visual And Speech Events in a Multimodal Application

Figure 1:
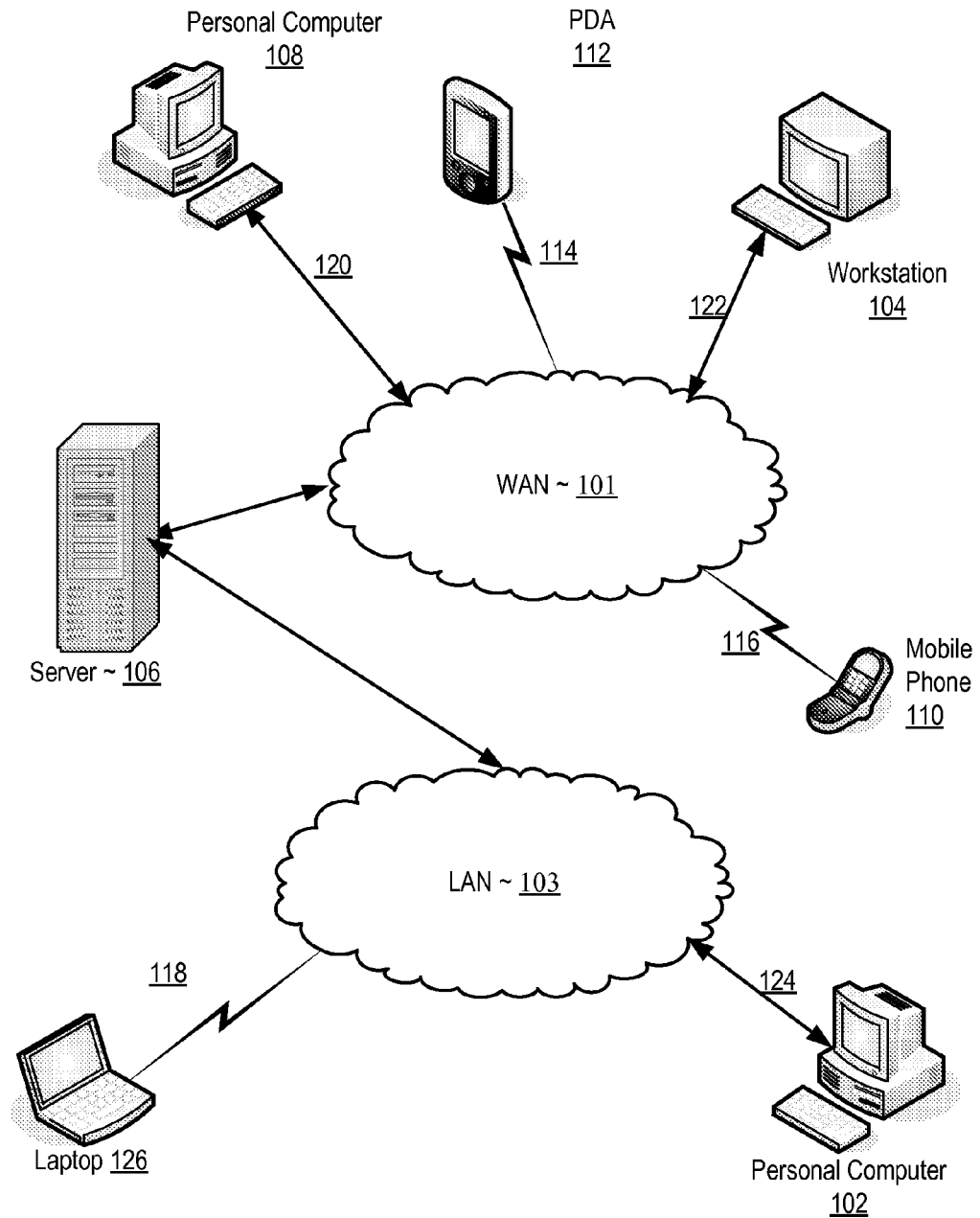
FIG. 1 sets forth a network diagram illustrating an exemplary system of devices each of which is capable of supporting a multimodal application.

Exemplary methods, systems, and products for synchronizing visual and speech events in a multimodal application according to embodiments of the present invention are described with reference to the accompanying drawings, beginning with FIG. 1. FIG. 1 sets forth a network diagram illustrating an exemplary system of devices each of which is capable of supporting a multimodal application such as a multimodal browser that is capable of displaying visual and speech events synchronized in accordance with the present invention. The system of FIG. 1 includes a number of computers connected for data communications in networks. Each of the computers of the system of FIG. 1 may have a multimodal application such as a multimodal browser installed upon it.

The data processing system of FIG. 1 includes wide area network ("WAN") (101) and local area network ("LAN") (103). The network connection aspect of the architecture of FIG. 1 is only for explanation, not for limitation. In fact, systems having multimodal applications according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, server (106) implements a gateway, router, or bridge between LAN (103) and WAN (101). Server (106) may be any computer capable of accepting a request for a resource from a client device and responding by providing a resource to the requester. One example of such a server is an HTTP ('HyperText Transport Protocol') server or 'web server.' The exemplary server (106) is capable of serving up multimodal web pages having visual and speech events synchronized according to embodiments of the present invention. The exemplary server (106) of FIG. 1 is also capable of supporting a multimodal web application capable of synchronizing visual and speech events by receiving from a user speech, determining a semantic interpretation of the speech, calling a global application update handler, identifying, by the global application update handler, an additional processing function in dependence upon the semantic interpretation, and executing the additional function. The use of such a global application update handler by the multimodal application advantageously provides a vehicle for additional processing of semantic interpretations given to speech commands received from a user.

The exemplary client devices (108, 112, 104, 110, 126, and 102) support multimodal browser and are coupled for data communications with a multimodal web application on the server (106) that capable of serving up multimodal web pages according to embodiments of the present invention. A 'multimodal browser,' as the term is used in this specification, generally means a web browser capable of receiving multimodal input and interacting with users with multimodal output. Multimodal browsers typically render web pages written in XHTML+Voice (X+V).

In the example of FIG. 1, several exemplary devices including a PDA (112), a computer workstation (104), a mobile phone (110), and a personal computer (108) are connected to a WAN (101). Network-enabled mobile phone (110) connects to the WAN (101) through a wireless link (116), and the PDA (112) connects to the network (101) through a wireless link (114). In the example of FIG. 1, the personal computer (108) connects through a wireline connection (120) to the WAN (101) and the computer workstation (104) connects through a wireline connection (122) to the WAN (101). In the example of FIG. 1, the laptop (126) connects through a wireless link (118) to the LAN (103) and the personal computer (102) connects through a wireline connection (124) to LAN (103). In the system of FIG. 1, exemplary client devices (108, 112, 104, 110, 126, and 102) support multimodal applications, such multimodal browsers, capable of receiving speech input from a user and providing the speech input to a multimodal web application on the server (106) either as streaming speech or as text converted from the speech by a speech recognition engine on the client.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Multimodal applications that support synchronizing visual and speech events according to embodiments of the present invention are generally implemented with computers, that is, with automated computing machinery. For further explanation, therefore, FIG. 2 sets forth a block diagram of automated computing machinery comprising an exemplary server (151) capable of synchronizing visual and speech events by receiving from a user speech, determining a semantic interpretation of the speech, calling a global application update handler, identifying, by the global application update handler, an additional processing function in dependence upon the semantic interpretation, and executing the additional function.

Figure 2:
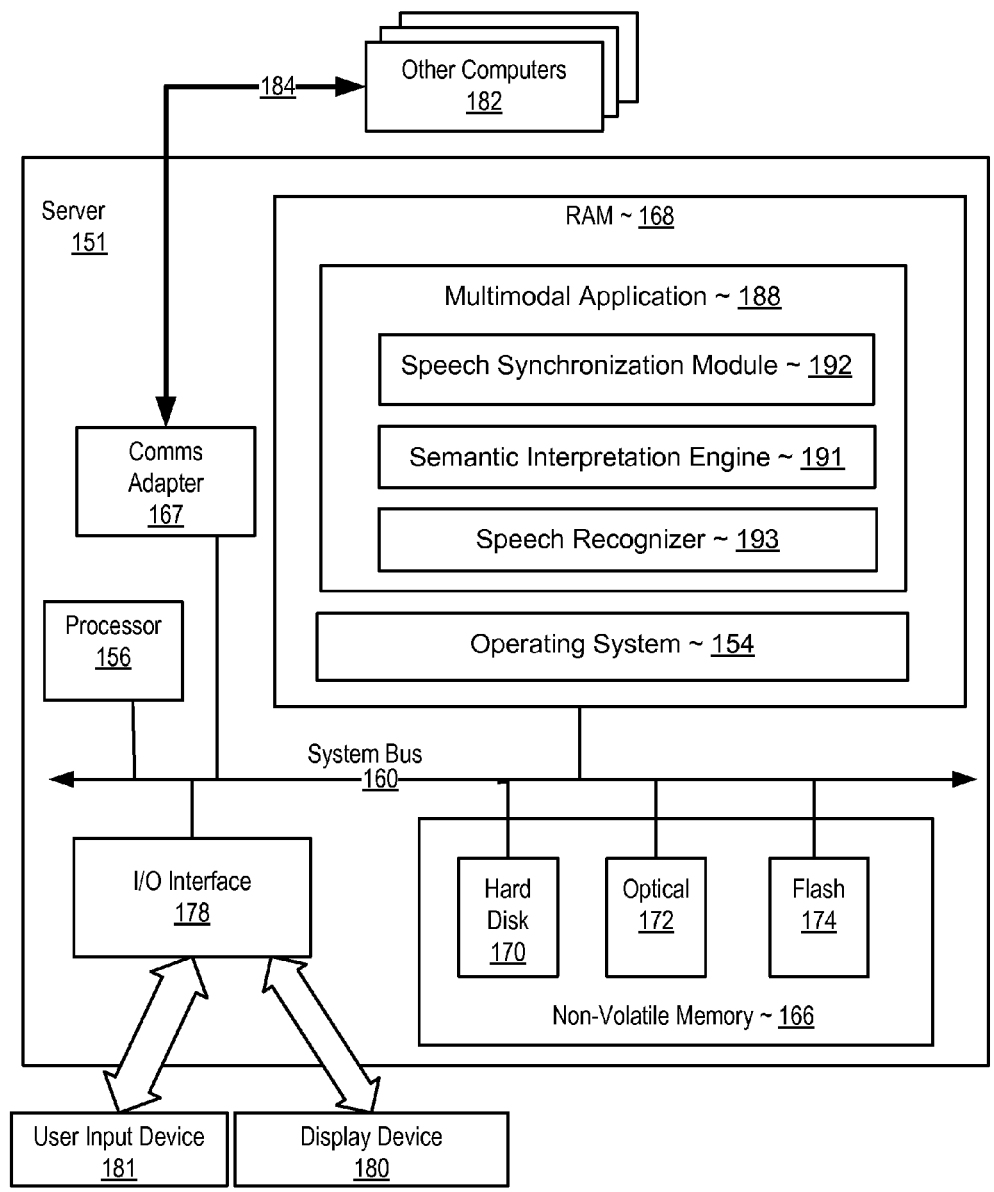
FIG. 2 sets forth a block diagram of automated computing machinery comprising an exemplary server capable of synchronizing visual and speech events.

The server (151) of FIG. 2 includes at least one computer processor (156) or 'CPU' as well as random access memory (168) ("RAM") which is connected through a system bus (160) to processor (156) and to other components of the computer. Stored in RAM (168) is an operating system (154). Operating systems useful in computers according to embodiments of the present invention include UNIX™, Linux™, Microsoft NT™, AIX™, IBM's i5/OS, and many others as will occur to those of skill in the art.

Also stored in RAM (168) is a multimodal application (188) having a speech synchronization module information module (192) capable generally of synchronizing visual and speech events by receiving from a user speech, determining a semantic interpretation of the speech, calling a global application update handler, identifying, by the global application update handler, an additional processing function in dependence upon the semantic interpretation, and executing the additional function.

Speech may be received in the multimodal application (188) either as speech streamed from a client device or as text received from a multimodal browser installed on a client that supports a speech recognition engine. The exemplary multimodal application includes a speech recognizer (193) useful in receiving speech and converting the speech to text by parsing the received speech against a grammar. A grammar is a predefined set of words or phrases that the speech recognizer implementing the grammar will recognize. Typically each dialog defined by a particular form or menu being presented to a user has one or more grammars associated with the form or menu defining the dialog. Such grammars are active only when that form or menu is active.

The exemplary multimodal application (188) of FIG. 2 also includes a semantic interpretation engine (191) capable of determining a semantic interpretation of the speech recognized by the speech recognizer (193). The semantic interpretation engine of FIG. 2 receives recognized speech either as text or in another form and assigns a semantic meaning to the input. For example, many words that users utter such as "yes," "affirmative," "sure," and "I agree," could be given the same semantic meaning of "yes."

The exemplary speech synchronization module information module (192) of FIG. 2 determines a semantic interpretation of the speech by calling the semantic interpretation engine parameterized with the speech received from the user and the semantic interpretation engine returns to the speech synchronization module one or more a semantic interpretations of the speech. The speech synchronization module information module (192) then calls a global application update handler which in turn identifies for each semantic interpretation an additional processing function in dependence upon the semantic interpretation and executes the additional function.

An additional processing function may be any software function capable of performing any action whose identification and execution is dependent upon the semantic interpretation of the speech. Consider the example of multimodal application that receives a speech command from a user currently in a dialog with a multimodal menu. The user says 'go on' and the semantic interpretation engine interprets the speech as an instruction from the user to move to the next menu. An synchronization module information module (192) of the present invention is capable of calling a global update handler which identifies a particular function that identifies and displays advertisement to the user prior to updating the visual elements of the next menu and starting for the user the next menu. Such a global application update handler advantageously provides a vehicle for additional processing prior to updating the visual elements and voice forms or menus of a multimodal application.

Server (151) of FIG. 2 includes non-volatile computer memory (166) coupled through a system bus (160) to processor (156) and to other components of the server (151). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary server (151) of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary server (151) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in multimodal applications according to embodiments of the present invention include modems for wired dial-up communications, Ethernet (IEEE 802.3) adapters for wired network communications, and 802.11b adapters for wireless network communications.

Synchronizing visual and speech events is often carried out by multimodal applications on servers receiving from a user speech through a multimodal browser running on a client device coupled for data communications with the server. For further explanation, therefore, FIG. 3 sets forth a block diagram of automated computing machinery comprising an exemplary client (152) useful in synchronizing visual and speech events according to embodiments of the present invention.

Figure 3:
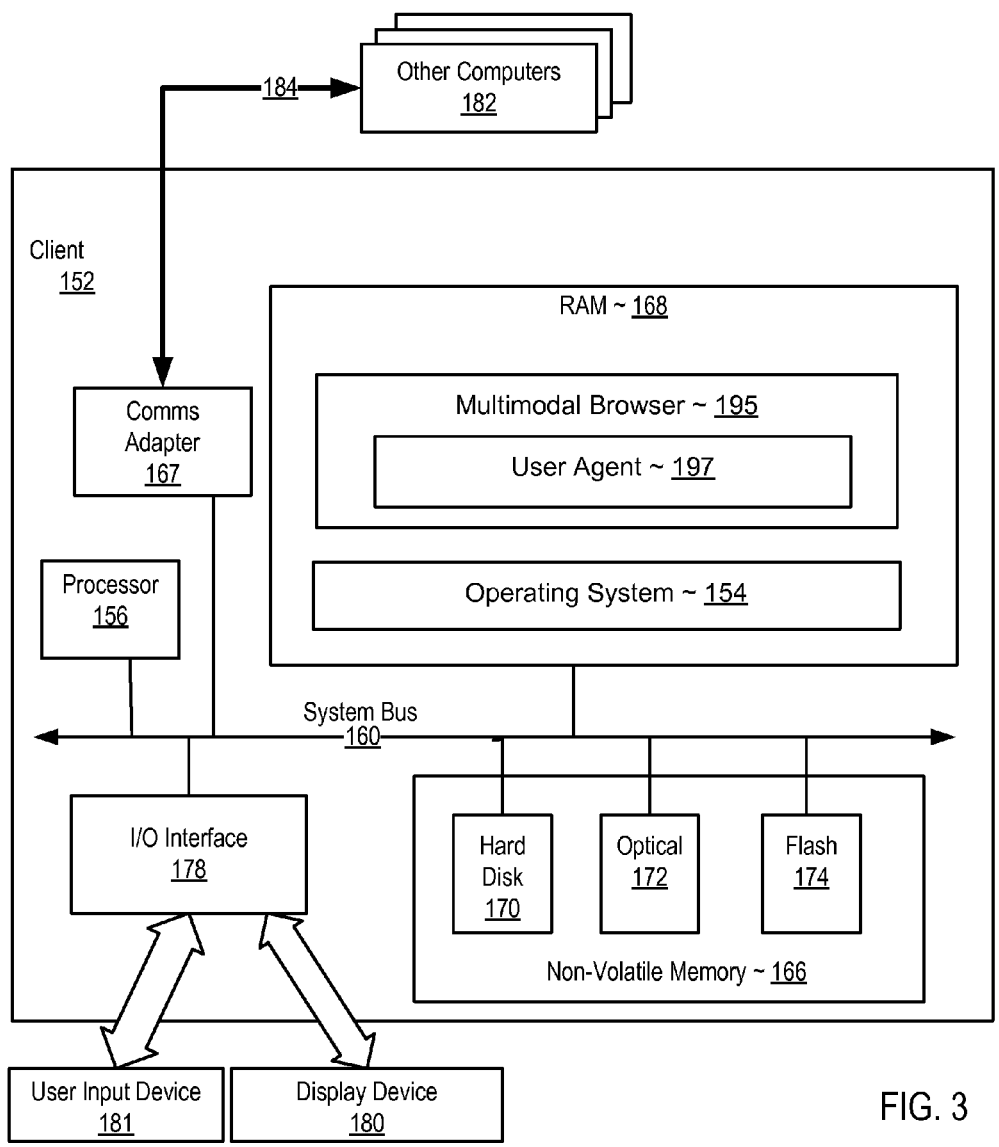
FIG. 3 sets forth a block diagram of automated computing machinery comprising an exemplary client useful in synchronizing visual and speech events.

The client (152) of FIG. 3 includes at least one computer processor (156) or 'CPU' as well as random access memory (168) ("RAM") which is connected through a system bus (160) to processor (156) and to other components of the computer. Stored in RAM (168) is an operating system (154). Operating systems useful in computers according to embodiments of the present invention include UNIX™, Linux™, Microsoft NT™, AIX™, IBM's i5/OS, and many others as will occur to those of skill in the art.

Also stored in RAM (168) is a multimodal browser (195) capable of displaying visual and speech events synchronized according to embodiments of the present invention.

The exemplary multimodal browser (195) of FIG. 3 also includes a user agent (197) capable of receiving from a user speech and converting the speech to text by parsing the received speech against a grammar. A grammar is a set of words or phrases that the user agent will recognize. Typically each dialog defined by a particular form or menu being presented to a user has one or more grammars associated with the form or menu. Such grammars are active only when the user is in that dialog.

Client (152) of FIG. 3 includes non-volatile computer memory (166) coupled through a system bus (160) to processor (156) and to other components of the client (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary client of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary client (152) of FIG. 3 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in multimodal browsers according to embodiments of the present invention include modems for wired dial-up communications, Ethernet (IEEE 802.3) adapters for wired network communications, and 802.11b adapters for wireless network communications.

Figure 4:
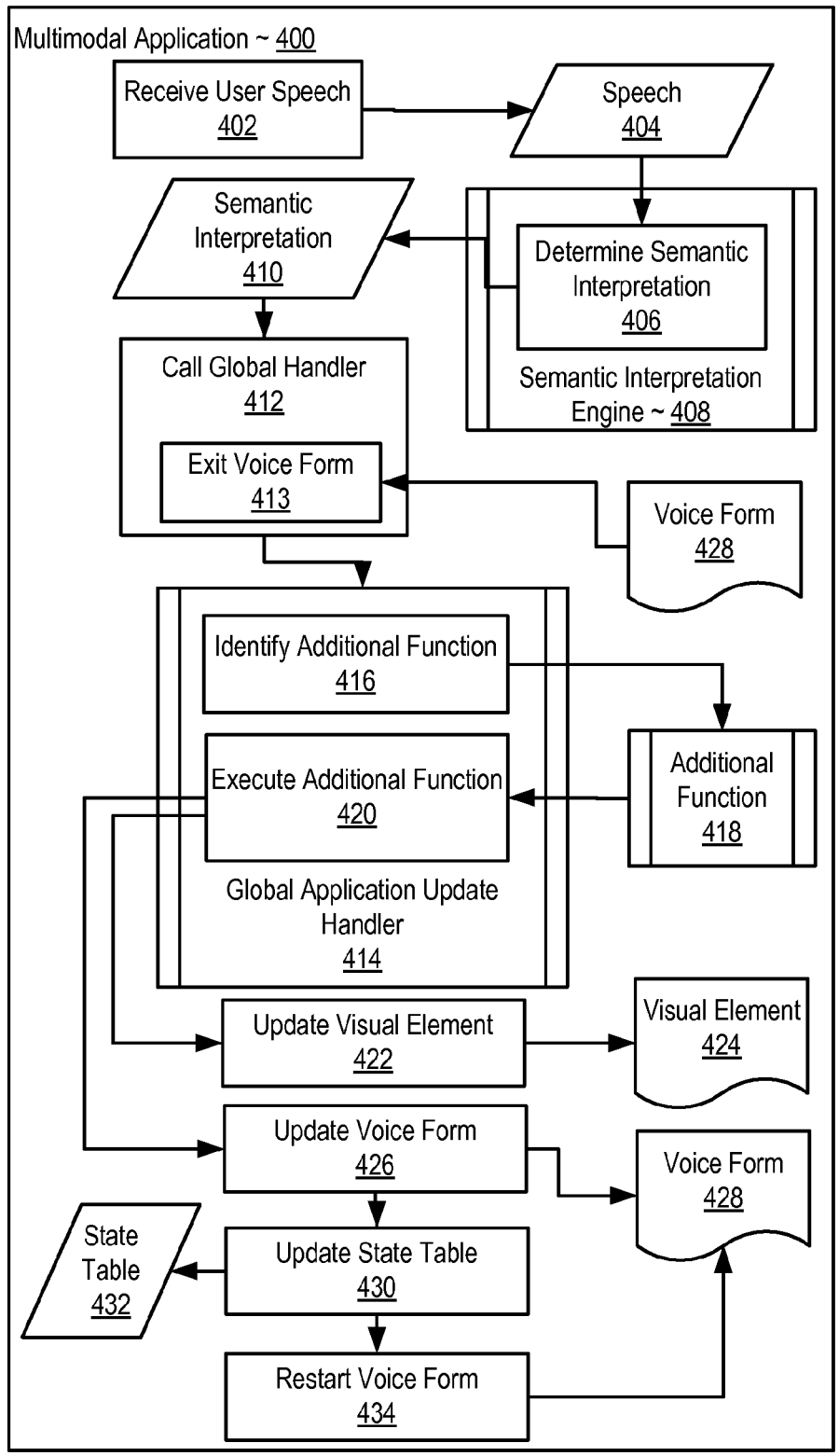
FIG. 4 sets forth a flow chart illustrating an exemplary method for synchronizing visual and speech events in a multimodal application.

For further explanation, FIG. 4 sets forth a flow chart illustrating an exemplary method for synchronizing visual and speech events in a multimodal application. The method of FIG. 4 includes receiving (402) from a user speech (404). As discussed above, receiving (402) from a user speech (404) may be carried out by speech recognizer of a multimodal application on a server receiving speech streamed from a client device or as text received from a multimodal browser installed on a client that supports a user agent operating as a client side speech recognition engine. Receiving (402) from a user speech (404) typically includes receiving an utterance from a user and parsing the received utterance against an active grammar to recognize the utterance of the user as speech.

The method of FIG. 4 also includes determining (406) a semantic interpretation (410) of the speech (404). In the example of FIG. 4, determining a semantic interpretation of the speech is carried out by a semantic interpretation engine (408). As discussed above, a semantic interpretation engine typically receives recognized speech either as text or in another form and assigns a semantic meaning to the input. For example, many words that users utter such as "yes," "affirmative," "sure," and "I agree," could be given the same semantic meaning of "yes."

The method of FIG. 4 also includes calling (412) a global application update handler (414). As discussed above a global application update handler is a single handler called in response to the receipt of any speech command that is capable of advantageously identifying additional processing functions in dependence upon the semantic interpretation of the speech and executing the additional processing functions.

Calling (412) a global application update handler (414) may be carried out through an XML event tied to an XHTML <listener> element having attributes that activate the global application update handler. In the method of FIG. 4 a single XML event is invoked upon the return of any semantic interpretation of the speech received from the user.

In the method of FIG. 4, calling (412) a global application update handler (414) includes exiting (413) a voice form (428). As discussed above a voice form defines an interaction that collects values for a set of form item variables. Exiting the voice form may be carried by issuing a <vxml: return/> to the global application update handler which exits the voice form and returns to the multimodal application. Exiting the voice form advantageously provides a vehicle for identifying and executing additional functions outside any one particular voice form. Such additional functions are therefore available for identification and execution across voice forms, but the additional functions are identified in dependence upon a semantic interpretation often given to the speech based upon a grammar that is defined within the form.

Calling (412) a global application update handler (414) in the example of FIG. 4 includes exiting (413) a voice form (428). This is for example, and not for limitation. Another form of dialog includes a menu. A menu presents the user with a choice of options and then transitions to another dialog based on that choice. Calling (412) a global application update handler (414) may also include exiting a voice menu. Exiting the voice menu advantageously provides a vehicle for identifying and executing additional functions outside any one particular voice menu. Such additional functions are therefore available for identification and execution across voice menus, but the additional functions are identified in dependence upon a semantic interpretation often given to the speech based upon a grammar that is defined within the menu.

The method of FIG. 4 also includes identifying (416), by the global application update handler (414), an additional processing function (418) in dependence upon the semantic interpretation (408) and executing (420) the additional function (418). An additional processing function may be any software function capable of performing any action whose identification and execution is dependent upon the semantic interpretation of the speech. Additional processing function are often executed prior to updating the visual elements of a XHTML document and voice elements of a voice form in an X+V application. Consider the example of multimodal application that receives a speech command from a user currently in a dialog with a multimodal form designed to receive travel information. The user says 'England' and the semantic interpretation engine interprets the speech as an instruction from the user to travel to 'Great Britain.' Calling a global update handler identifies a particular function that identifies and displays advertisement for a guide to hotels in London. Such a global application update handler advantageously provides a vehicle for additional processing prior to updating the visual elements and voice forms or menus of a multimodal application.

In the example of FIG. 4, only one an additional processing function (418) is identified and executed. This is for explanation and not for limitation. In fact, synchronizing visual and speech events according to embodiments of the present invention may receive a plurality of semantic interpretations for the received speech and may call one or more additional functions in dependence upon one or more of the semantic interpretations.

The method of FIG. 4 also includes updating (422) a visual element (424) after executing (420) the additional function (418). Updating a visual element may be carried out by retuning the results of the semantic interpretation to an XHTML element of the X+V application.

The method of FIG. 4 also includes updating (426) a voice form (428) after executing (420) the additional function (418). Updating (426) a voice form (428) may be carried out by retuning the results of the semantic interpretation to a form item of the voice form.

The method of FIG. 4 also includes updating (430) a state table (432) after updating (426) the voice form (428). The state table (432) of FIG. 4 is typically implemented as a data structure containing for each paired visual element and voice field a value indicating the state of the element and voice field. For example, a state table may include for each paired visual element and voice field a unique value indicating that the current fields have been filled by receiving from a user an instruction and updating the field in response to the user instruction.

The method of FIG. 4 also includes restarting (434) the voice form (428) after executing the additional function. Restarting (434) the voice form (428) after executing the additional function is typically carried out in dependence upon the updated state table. Restarting (434) the voice form (428) in dependence upon the state table typically instructs the multimodal browser to prompt a user for the next unfilled voice field in the voice form.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for synchronizing visual and speech events in a multimodal application, the method comprising:
    calling a voice form of the multimodal application, wherein the multimodal application is run using at least one computer processor, wherein the multimodal application provides a multimodal web page to a client device over a network;
    receiving speech from a user;
    determining a semantic interpretation of at least a portion of the speech using the voice form;
    calling a global application update handler of the multimodal application and exiting the voice form;
    identifying, by the global application update handler, an additional processing function in dependence upon the semantic interpretation, wherein the additional processing function is independent of the voice form; and
    executing the additional processing function to synchronize visual and speech events in the multimodal application,
    wherein determining a semantic interpretation of at least a portion of the speech comprises determining a plurality of semantic interpretations of the at least a portion of the speech, and
    wherein identifying, by the global application update handler, an additional processing function in dependence upon the semantic interpretation comprises identifying, by the global application update handler, an additional processing function for each of the plurality of semantic interpretations.

2. The method of claim 1 further comprising updating a visual element after executing the additional processing function.

3. The method of claim 1 further comprising updating a voice form after executing the additional processing function.

4. The method of claim 3 further comprising updating a state table after updating the voice form.

5. The method of claim 1 further comprising restarting the voice form after executing the additional processing function.

6. The method of claim 1 wherein calling a global application update handler further comprises exiting a voice menu.

7. A system for synchronizing visual and speech events in a multimodal application, the system comprising:
    at least one computer processor;
    at least one computer memory operatively coupled to the computer processor; and
    computer program instructions disposed within the computer memory that, when executed, cause the at least one computer processor to:
        call a voice form of the multimodal application, wherein the multimodal application provides a multimodal web page to a client device over a network;
        receive speech from a user;
        determine a plurality of semantic interpretations of at least a portion of the speech using the voice form;
        call a global application update handler of the multimodal application and exit the voice form;
        identify, by the global application update handler, an additional processing function in dependence upon the semantic interpretation for each of the plurality of semantic interpretations, wherein the additional processing function is independent of the voice form; and
        execute the additional processing function to synchronize visual and speech events in the multimodal application.

8. The system of claim 7 further comprising computer program instructions disposed within the computer memory capable of updating a visual element after executing the additional processing function.

9. The system of claim 7 further comprising computer program instructions disposed within the computer memory capable of updating a voice form after executing the additional processing function.

10. The system of claim 9 further comprising computer program instructions disposed within the computer memory capable of updating a state table after updating the voice form.

11. The system of claim 7 further comprising computer program instructions disposed within the computer memory capable of restarting the voice form after executing the additional processing function.

12. The system of claim 7 wherein the computer program instructions disposed within the computer memory capable of exiting a voice menu.

13. A non-transitory computer-readable storage medium comprising instructions that, when executed on at least one processor in a computer, perform a method of synchronizing visual and speech events in a multimodal application, the method comprising:
    calling a voice form of the multimodal application, wherein the multimodal application provides a multimodal web page to a client device over a network;
    receiving speech from a user;
    determining a semantic interpretation of at least a portion of the speech using the voice form;
    calling a global application update handler of the multimodal application and exiting the voice form;
    identifying, by the global application update handler, an additional processing function in dependence upon the semantic interpretation, wherein the additional processing function is independent of the voice form; and
    executing the additional processing function to synchronize visual and speech events in the multimodal application, wherein determining a semantic interpretation of at least a portion of the speech comprises determining a plurality of semantic interpretations of the at least a portion of the speech; and wherein identifying, by the global application update handler, an additional processing function in dependence upon the semantic interpretation comprises identifying, by the global application update handler, an additional processing function for each of the plurality of semantic interpretations.

14. The non-transitory computer-readable storage medium of claim 13 further comprising computer program instructions that update a visual element after executing the additional processing function.

15. The non-transitory computer-readable storage medium of claim 13 further comprising computer program instructions that update a voice form after executing the additional processing function.

16. The non-transitory computer-readable storage medium of claim 13 further comprising computer program instructions that restart the voice form after executing the additional processing function.

17. The non-transitory computer-readable storage medium of claim 13 wherein computer program instructions that call a global application update handler further comprises exiting a voice menu.

* * * * *